ately pass through this connector since the two bars 17 are held in

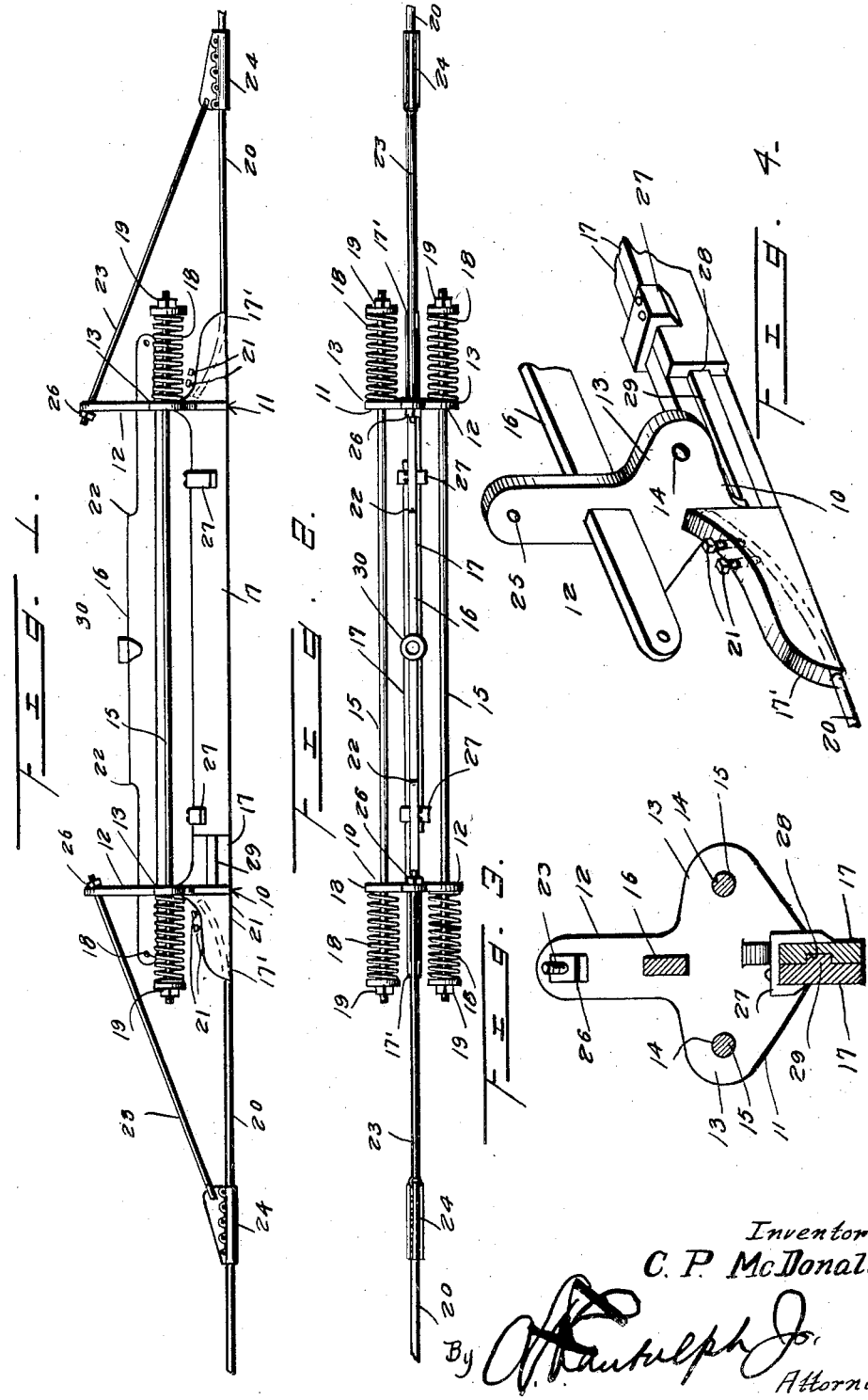

UNITED STATES PATENT OFFICE.

CHARLES P. McDONALD, OF KANSAS CITY, MISSOURI.

WIRE-CONNECTOR.

1,357,332.

Specification of Letters Patent.

Patented Nov. 2, 1920.

Application filed February 14, 1920. Serial No. 358,686.

*To all whom it may concern:*

Be it known that I, CHARLES P. McDONALD, a citizen of the United States, residing at Kansas City, in the county of Jackson and State of Missouri, have invented certain new and useful Improvements in Wire-Connectors; and I do hereby declare the following to be a full, clear, and exact description of the invention, such as will enable others skilled in the art to which it appertains to make and use the same.

This invention relates to an improved wire connector and is an improvement over the structures shown in my prior Patent No. 1,125,859, issued January 19th, 1915 and one object of the invention is to provide a wire connector which may be used in connection with conductor wires such as trolley wires and which will be so constructed that adjoining end portions of the trolley wire may be connected and the wire held under tension and thus held tightly stretched but at the same time permit it to have sufficient movement to accommodate expansion and contraction and further prevent the danger of breakage under excessive pressure by a trolley pole of a car.

Another object of the invention is to so construct this wire connector that the current may readily pass from one wire to the second and to prevent any danger of the two sections of the connector coming out of proper engagement.

Another object of the invention is to provide a trolley connector which will be very efficient in operation and comparatively simple in construction. This invention is illustrated in the accompanying drawings, wherein:

Figure 1 is a side elevation showing the connector in use.

Fig. 2 is a top plan view of the improved wire connector.

Fig. 3 is a transverse sectional view through the improved trolley connection.

Fig. 4 is a perspective view of the outer end portion of one section of the trolley connection.

This trolley connector is formed in two sections which are duplicate in construction and which are indicated in general by the numerals 10 and 11. Each of these sections is provided with a head plate 12 having side arms 13 in which are provided openings 14 to receive the rods 15. These rods 15 extend upon opposite sides of the supporting bar 16 and connecting bars 17 and the end portions of the rods extend beyond the head plate 12 and carry springs 18 which are held under tension by the nut 19. The two end sections of the connector will therefore have a tendency to move toward each other and thus place the wires 20 under tension. These wires 20 pass through openings formed in the outer end portions 17' of the bar 17 and are held in place by the set screws 21. Sliding movement of the head plates 12 upon the hanger bar 16 will be limited by the abutment shoulders 22 formed intermediate the ends of the hanger bars. In order to prevent the danger of the wires 20 from slipping out of engagement with the set screws 21 there have been provided angle rods 23 which are connected with the wires by clamps 24 and have their free ends passing through openings 25 in the head plates 12 and threaded for carrying securing nuts 26. Clamp-arms or cleats 27 are carried by and engage the contact bars 17 thus retaining the bars 17 in sliding engagement, one of these bars being provided with a longitudinally extending groove 28 and the second being provided with a longitudinally extending rib 29 fitting into the groove 28 so that the bars will be prevented from moving out of engagement. It will be seen that the bars will be guided in their sliding movement and prevent the parts from becoming disconnected.

When this wire connector is in use the supporting bar 16 will be suspended from a hanger wire through the medium of the hanger 30 and the anchor rods 23 will then be connected with the trolley wires by the clamps 24. The wires will be connected with the outer end portions of the bars 17 and when the springs 18 are placed under proper tension through the medium of the abutment screws 19 these springs will move the end sections of the connector toward each other and thus draw the trolley wires tight. The wheel of a trolley pole can pass along one wire 20 and upon reaching the connector will ride along the bars 17 from one wire to the other. The current from one wire to the second will readily pass through this connector since the two bars 17 are held in close engagement and further the current may pass through the anchor rod to one head plate and through the rods 15 to the second head plate from which it will pass through the second anchor rods to the second wire. There has therefore been provided a very efficient wire connector which will hold the two wires under proper tension and which will accommodate expansion and contraction under the action of heat and cold and will also permit the trolley wires to have movement under action of the trolley poles without danger of breaking the wires or connector.

What is claimed is:

1. A wire connector comprising oppositely disposed sections each having a head plate having side arms, rods extending through the side arms from the head plate, abutments carried by the rods, spring elements positioned between the abutments and head plates to move the head plates toward each other, a hanger bar having its end portions passing through the head plate to slidably mount the head plates, and contact bars carried by the head plates having their outer end portions provided with wire receiving sockets and having their inner end portions extending in overlapping relation, one of the contact bars being provided with a longitudinally extending groove and the second with a longitudinally extending rib slidably fitting into the groove, and cleats carried by the conductor bars and holding the conductor bars in sliding engagement.

2. A wire connector comprising end sections each having a head plate, a hanger bar passing through the head plates to slidably mount the sections, contact bars carried by the head plates beneath the hanger bar and extending in overlapping relation, means retaining the conductor bars in sliding engagement, rods extending through the head plates upon opposite sides of the hanger bar and conductor bars, and resilient means carried by the rods and engaging the head plates to move the plates toward each other.

3. A wire connector comprising end sections each having a head plate, a hanger bar passing through the head plates to slidably mount the sections, slidably connected contact bars carried by the head plate, guide members for said contact bars, a pair of rods extending from said head plate upon opposite sides of the hanger bar and above the contact plates, resilient means carried by the opposite end of said rods and engaging the plates to force the latter toward each other, and adjustable stop nuts for said resilient means on the opposite ends of said rod.

In testimony whereof I affix my signature in presence of two witnesses.

CHARLES P. McDONALD.

Witnesses:
JAMES LAWRENCE,
C. J. GARVER.